US012584851B2

(12) United States Patent
Zhang

(10) Patent No.: US 12,584,851 B2
(45) Date of Patent: *Mar. 24, 2026

(54) GAS SENSOR

(71) Applicant: AAC ACOUSTIC TECHNOLOGIES (SHENZHEN) CO., LTD., Shenzhen (CN)

(72) Inventor: Jinyu Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 279 days.

This patent is subject to a terminal disclaimer.

(21) Appl. No.: 18/454,775

(22) Filed: Aug. 23, 2023

(65) Prior Publication Data

US 2024/0219294 A1    Jul. 4, 2024

Related U.S. Application Data

(63) Continuation of application No. PCT/CN2023/084864, filed on Mar. 29, 2023.

(30) Foreign Application Priority Data

Dec. 30, 2022    (CN) .......................... 202223612509.0

(51) Int. Cl.
*G01N 21/17* (2006.01)

(52) U.S. Cl.
CPC . *G01N 21/1702* (2013.01); *G01N 2021/1704* (2013.01)

(58) Field of Classification Search
None
See application file for complete search history.

(56) References Cited

U.S. PATENT DOCUMENTS

| | | | | |
|---|---|---|---|---|
| 10,753,858 | B2 * | 8/2020 | Kolb | G01N 21/1702 |
| 11,754,492 | B2 * | 9/2023 | Uehlinger | G01N 21/1702 73/24.01 |
| 2011/0296900 | A1 * | 12/2011 | Thorson | G01N 21/1702 73/24.02 |

* cited by examiner

*Primary Examiner* — Suman K Nath
(74) *Attorney, Agent, or Firm* — Wiersch Law Group

(57) ABSTRACT

The present disclosure provides a gas sensor including a shell with a receiving cavity, an acoustic sensor, a partition plate and a flexible film accommodated in the receiving cavity. The partition plate and the flexible film jointly divide the receiving cavity into a first cavity and a second cavity, the first cavity is a sealed cavity formed by the joint enclosure of the flexible film, the partition plate, the side wall and the substrate. The acoustic sensor is located in the first cavity, the infrared transmitter is located in the second cavity. Compared with the related art, the gas sensor disclosed by the present disclosure could improve the sensitivity of the product.

8 Claims, 3 Drawing Sheets

100

100

GAS SENSOR

FIELD OF THE PRESENT DISCLOSURE

The present disclosure relates to the technical field of sensors, and in particular relates to a gas sensor.

DESCRIPTION OF RELATED ART

A gas sensor is a converter that converts a certain gas volume fraction into a corresponding electric signal. Existing gas sensors usually include a housing, a damping net, a substrate, an infrared transmitter, and an acoustic sensor, the external gas passes through the damping net through diffusion and is balanced with the internal gas concentration. When the sensor is working, the infrared transmitter emits infrared light of a specific wavelength at a certain sound frequency (e.g., 30 Hz). This wavelength of the infrared light is strongly absorbed by the gas to be measured and converted into heat. An alternating pressure signal is generated in the internal chamber, which is received by the acoustic sensor and converted into an electric signal. The higher the concentration of the gas to be measured in the gas, the stronger the low frequency signal is. From the signal strength output by the microphone, the concentration of the gas to be measured can be calculated.

The infrared transmitter and the acoustic sensor in the related art are located in the same cavity. The modulated infrared signal produces electrical interference to the acoustic sensor, leading to measurement errors. The low strength of the electrical signal excited by the infrared signal will lead to a lack of sensitivity of the gas sensor. In addition, the external sound signal will form a strong noise interference to the gas sensor, resulting in inaccurate detection results of the gas sensor.

Therefore, it is necessary to provide a gas sensor to solve the above problems.

SUMMARY OF THE PRESENT DISCLOSURE

The present disclosure is to provide a gas sensor, which can solve the technical problem that the gas sensor in the related art has a lack of sensitivity.

For achieving the object mentioned above, the disclosure provides a gas sensor, including:

a shell with a receiving cavity, comprising a cover, a substrate spaced apart from the cover, and a side wall located between the cover and the substrate, the cover, the substrate, and the side wall jointly enclosing to form the receiving cavity, and an infrared transmitter, an acoustic sensor, a partition plate and a flexible film accommodated in the receiving cavity, wherein the partition plate is connected with the substrate and the side wall, the flexible film is located between the cover and the side wall, the flexible film covers the side wall and the partition plate, the partition plate and the flexible film jointly divide the receiving cavity into a first cavity and a second cavity, the first cavity is a sealed cavity formed by the joint enclosure of the flexible film, the partition plate, the side wall and the substrate, the acoustic sensor is located in the first cavity, the infrared transmitter is located in the second cavity, the shell comprises a vent hole communicating with the outside and the second cavity, the flexible film, the first cavity and the second cavity form a resonant system, an intrinsic frequency of the resonant system is the same as a modulation frequency of the infrared transmitter.

As an improvement of the above, the cover comprises a top plate, a connecting portion bending and extending from the top plate to the side wall, and a fixing portion bending and extending from the connecting portion to the outside, the fixing portion is fixed with an upper surface of the side wall.

As an improvement of the above, the fixing portion is smaller than the upper surface of the side wall, one end of the flexible film is connected to the upper surface of the side wall and the other end of the flexible film is connected to the partition plate, the flexible film is located at an internal side of the fixing portion.

As an improvement of the above, the gas sensor further comprises a weight connected with the flexible film.

As an improvement of the above, the weight is located in the first cavity.

As an improvement of the above, the side wall comprises two first side walls located on long-axis sides and two second side walls located on short-axis sides, the partition plate is connected with the two first side walls opposite to each other.

As an improvement of the above, the partition plate and the side wall are configured as an integrated structure.

As an improvement of the above, the acoustic sensor and the infrared transmitter are fixed with the substrate.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
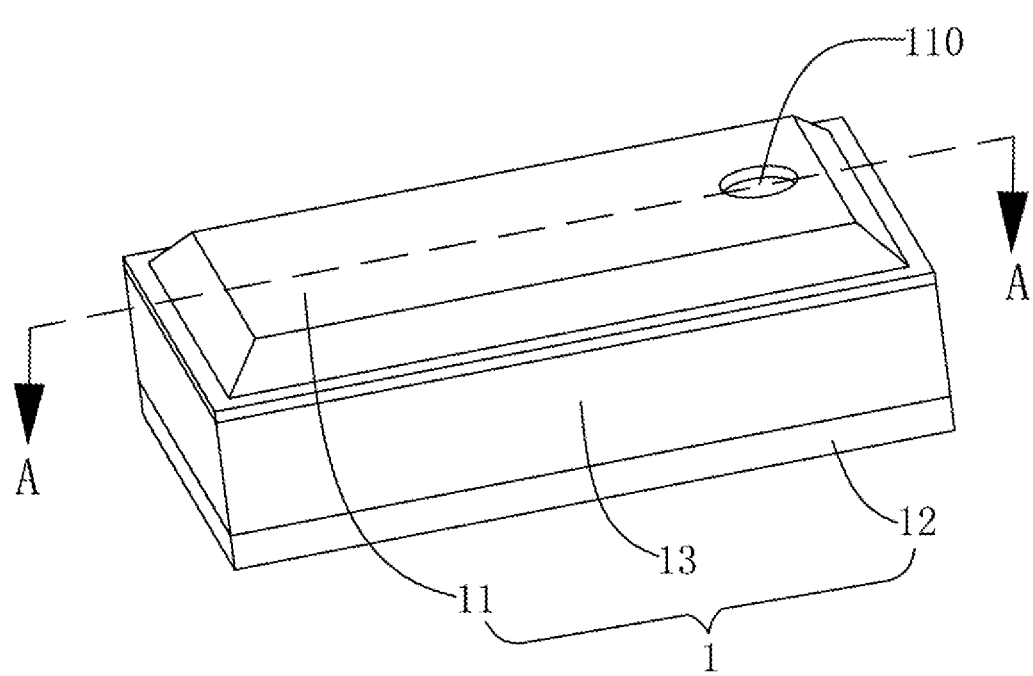
FIG. 1 is an isometric view of a gas sensor in accordance with an exemplary embodiment of the present disclosure.
Figure 2:
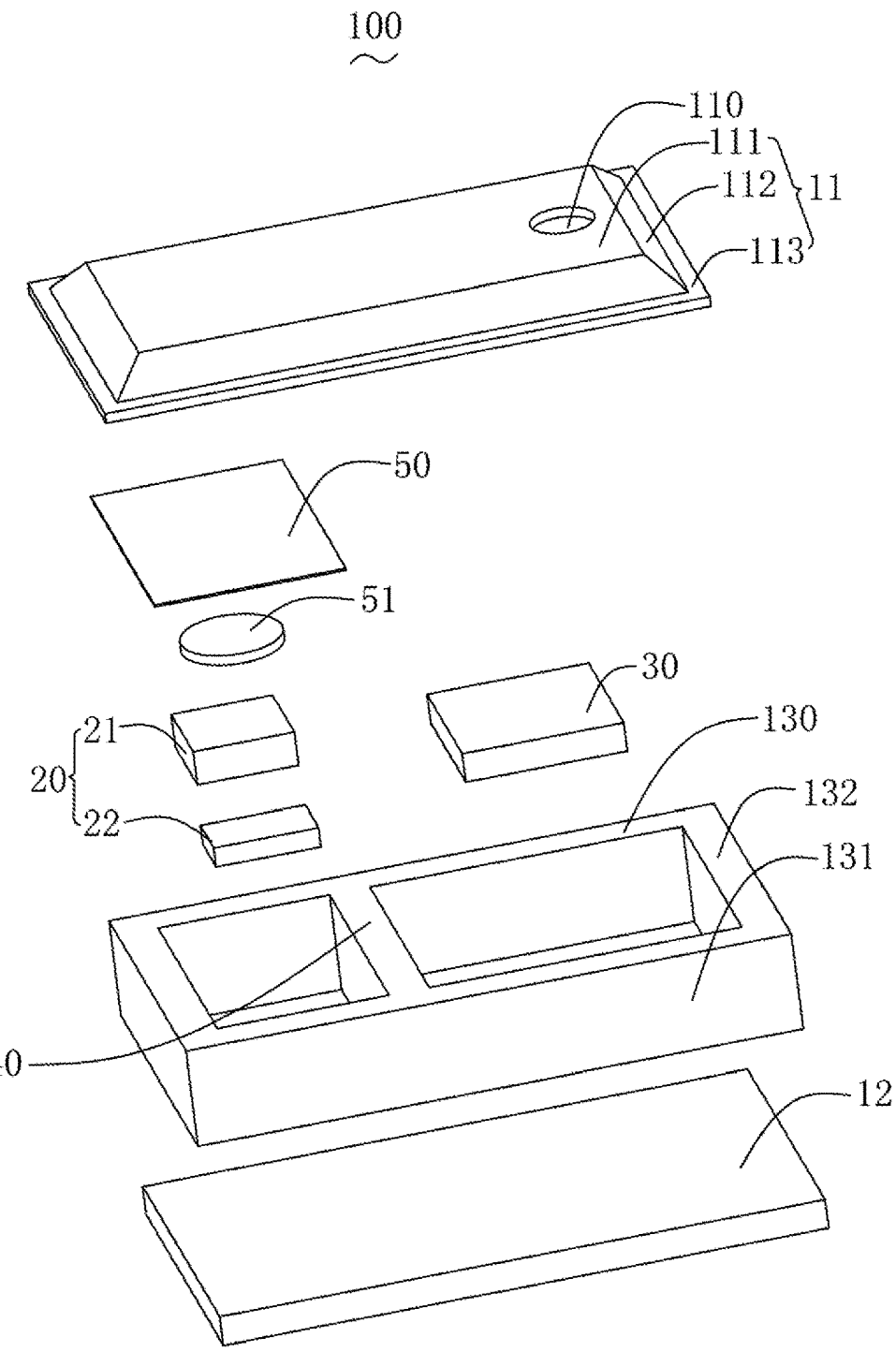
FIG. 2 is an exploded view of the gas sensor in FIG. 1.
Figure 3:
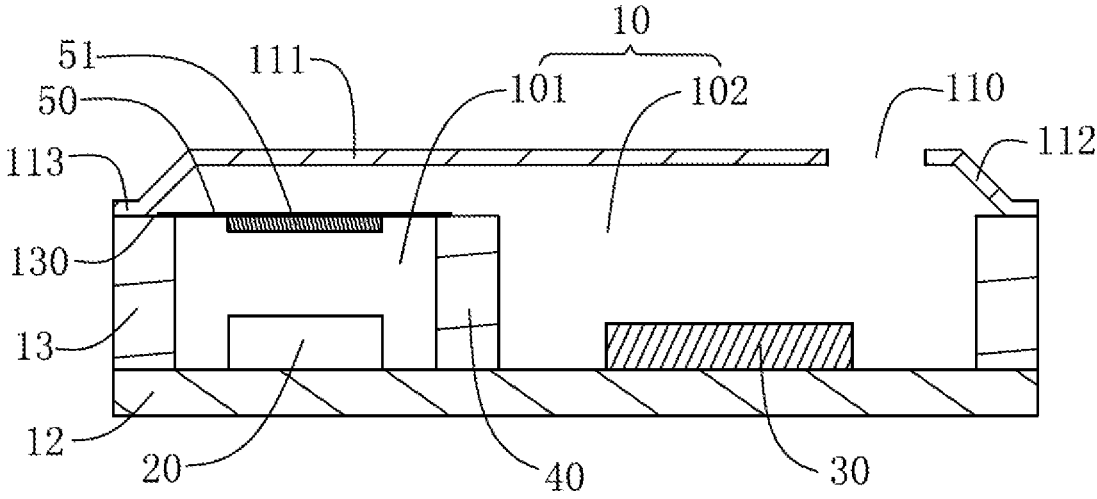
FIG. 3 is a cross-sectional view of the gas sensor taken along line A-A in FIG. 1.

Please refer to FIGS. 1-3, a gas sensor 100 includes a shell 1 with a receiving cavity 10, and an acoustic sensor 20 and an infrared transmitter 30 located in the receiving cavity 10. The shell 1 includes a cover 11, a substrate 12 spaced apart from the substrate 12, and a side wall 13 located between the cover 11 and the substrate 12, the cover 11, the substrate 12, and the side wall 13 jointly enclose to form the receiving cavity 10. The infrared transmitter 30 emits light into receiving cavity 10, the emitted light may be infrared light, in particular, pulsed light, such as pulsed infrared light. The acoustic sensor 20 may include a microphone, in particular a MEMS microphone 21 which detects an acoustic signal caused by the emitted light according the photoacoustic principle. Therefore, the acoustic sensor 20 could include an integrated circuit, such as a dedicated integrated circuit or an ASIC 22.

In the present embodiment, the gas sensor 100 further includes a partition plate 40 and a flexible film 50 accommodated in the receiving cavity 10, the partition plate 40 is connected with the substrate 12 and the side wall 13, the flexible film 50 is located between the substrate 12 and the side wall 13, the flexible film 50 is attached to a side of the side wall 13 and the partition plate 40 far away from the substrate 12. The partition plate 40 and the flexible film 50 jointly divide the receiving cavity 10 into a first cavity 101 and a second cavity 102, the first cavity 101 is a sealed cavity formed by the joint enclosure of the flexible film 50, the partition plate 40, the side wall 13 and the substrate 13, the acoustic sensor 20 is located in the first cavity 101, the infrared transmitter 30 is located in the second cavity 102, the flexible film 50, the first cavity 101 and the second cavity 102 form a resonant system, an intrinsic frequency of the resonant system is the same as a modulation frequency of the infrared transmitter 30. In addition, the shell 1 further includes a vent hole 110 communicating with the outside and the second cavity 102.

The outside gas enters into the second cavity 102 through the vent hole 110, the infrared transmitter 30 emits infrared light of a specific wavelength at a certain frequency (e.g., 30 Hz), this wavelength of the infrared light is strongly absorbed by the gas to be measured and converted into heat, an alternating pressure signal is generated in the second cavity 102, the flexible film 50 is driven to resonate, thus creating a strong acoustic resonance signal in the first cavity 101, which is thereby converted into an electrical signal. According to the signal strength output by the acoustic sensor 20, the concentration of the gas to be measured can be calculated.

In the present embodiment, as the infrared emitter 30 and the acoustic sensor 20 are arranged in different cavities, the generation of interference signals can be avoided. In addition, the intrinsic frequency of the resonant cavity is the same as the modulation frequency of the infrared transmitter 30, the flexible film 50 is in resonance, thereby forming the acoustic resonance, which can enhance the sound signal by 10 dB-20 dB and significantly improve the sensitivity of the product. The modulation frequency of the infrared transmitter 30 is in a range of 40 Hz-60 Hz which is much lower than a frequency of ambient noise, ambient noise is isolated by the flexible film 50, which will not interfere with the acoustic sensor 20, the acoustic sensor 20 is located in the sealed first cavity 101, which prevents particles from entering the first cavity 101 and causing the acoustic sensor 20 to fail.

The cover 11 comprises a top plate 111, a connecting portion 112 bending and extending from the top plate 111 to the side wall 13 and a fixing portion 113 bending and extending from the connecting portion 112 to the outside, the fixing portion 113 is fixed with an upper surface 130 of the side wall 13. The top plate 111 and the connecting portion 112 enclose to form a vibration space for the flexible film 50 to vibrate. The fixing portion 113 is smaller than the upper surface 130, which allows the upper surface 130 of the side wall 13 to leave space for a fixed and connected with the flexible film 50, the flexible film 50 is located on an internal side of the fixed portion 113, one end of the flexible film 50 is connected to the upper surface 130 of the side wall 13 and the other end of the flexible film 50 is connected to the partition plate 40. In order to adjust the resonant frequency of the resonant system, a weight 51 can be provided on the flexible film 50, and the weight 51 can be located in the first cavity 101 to make full use of the space of the first cavity 101.

Preferably, the side wall 13 includes two first side walls 131 located on a long-axis sides and two second side walls 132 located on a short-axis sides, the partition plate 40 is connected with the two first side walls 131 opposite to each other. The partition plate 40 and the side wall 13 are configured as an integrated structure, thus reducing assembly steps and facilitating standardized production. In the other embodiment, the partition plate and the side walls could be separately formed.

In addition, the infrared transmitter 30 and the acoustic sensor 20 are fixed to the substrate 12, the vent hole 110 is provided in the cover 111.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A gas sensor, including:

a shell with a receiving cavity, comprising a cover, a substrate spaced apart from the cover, and a side wall located between the cover and the substrate, the cover, the substrate, and the side wall jointly enclosing to form the receiving cavity, and an infrared transmitter, an acoustic sensor, a partition plate and a flexible film accommodated in the receiving cavity, wherein the partition plate is connected with the substrate and the side wall, the flexible film is located between the cover and the side wall, the flexible film covers the side wall and the partition plate, the partition plate and the flexible film jointly divide the receiving cavity into a first cavity and a second cavity, the first cavity is a sealed cavity formed by the joint enclosure of the flexible film, the partition plate, the side wall and the substrate, the acoustic sensor is located in the first cavity, the infrared transmitter is located in the second cavity, the shell comprises a vent hole communicating with the outside and the second cavity, the flexible film, the first cavity and the second cavity form a resonant system, an intrinsic frequency of the resonant system is the same as a modulation frequency of the infrared transmitter.

2. The gas sensor as described in claim 1, wherein the cover comprises a top plate, a connecting portion bending and extending from the top plate to the side wall, and a fixing portion bending and extending from the connecting portion to the outside, the fixing portion is fixed with an upper surface of the side wall.

3. The gas sensor as described in claim 2, wherein the fixing portion is smaller than the upper surface of the side wall, one end of the flexible film is connected to the upper surface of the side wall and the other end of the flexible film is connected to the partition plate, the flexible film is located at an internal side of the fixing portion.

4. The gas sensor as described in claim 1, wherein further comprises a weight connected with the flexible film.

5. The gas sensor as described in claim 4, wherein the weight is located in the first cavity.

6. The gas sensor as described in claim 1, wherein the side wall comprises two first side walls located on long-axis sides and two second side walls located on short-axis sides, the partition plate is connected with the two first side walls opposite to each other.

7. The gas sensor as described in claim 6, wherein the partition plate and the side wall are configured as an integrated structure.

8. The gas sensor as described in claim 1, wherein the acoustic sensor and the infrared transmitter are fixed with the substrate.

\* \* \* \* \*